United States Patent [19]

Contarino et al.

[11] Patent Number: 5,822,047
[45] Date of Patent: Oct. 13, 1998

[54] MODULATOR LIDAR SYSTEM

[75] Inventors: Vincent M. Contarino, Warrington; Peter R. Herczfeld, Philadelphia, both of Pa.; Linda J. Mullen, Cherry Hill, N.J.

[73] Assignee: The United States of America as represented by the Secretary of the Navy, Washington, D.C.

[21] Appl. No.: 521,083

[22] Filed: Aug. 29, 1995

[51] Int. Cl.⁶ .................................................. G01C 3/08
[52] U.S. Cl. ........................................ 356/5.01; 356/5.02
[58] Field of Search .................................. 356/5.01–5.15

[56] References Cited

U.S. PATENT DOCUMENTS

| | | |
|---|---|---|
| 4,140,060 | 2/1979 | Brenner . |
| 4,666,295 | 5/1987 | Duvall, III et al. . |
| 4,716,444 | 12/1987 | Mongeon et al. . |
| 4,743,110 | 5/1988 | Arnaud et al. . |
| 4,759,623 | 7/1988 | Meier . |
| 4,786,176 | 11/1988 | Froome ................................... 356/373 |
| 4,963,024 | 10/1990 | Ulich ...................................... 356/342 |
| 5,181,138 | 1/1993 | Davis et al. ............................ 359/239 |
| 5,239,296 | 8/1993 | Jenkins .................................. 340/936 |
| 5,589,928 | 12/1996 | Babbitt et al. ......................... 356/5.09 |

*Primary Examiner*—Stephen C. Buczinski
*Attorney, Agent, or Firm*—Ron Billi; Louis Allahut

[57] ABSTRACT

A modulated LIDAR system is disclosed, in which a laser for generating an optical carrier signal and a microwave generator for generating a coded microwave signal are provided. A modulator is further provided for modulating the carrier signal with the microwave signal, whereby a modulated signal is generated. A method of detecting a reflective surface is also disclosed, in which an optical carrier signal is generated, the carrier signal is modulated with a coded microwave signal, the modulated signal is reflected off of a reflective surface and the reflected signal is recovered.

5 Claims, 10 Drawing Sheets

MODULATOR LIDAR SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

The present invention relates to detection and ranging systems and, more particularly, to techniques in which LIDAR and RADAR technologies are combined to improve the resolution and sensitivity of conventional LIDAR.

Since the early 1930's, acoustic echo sounders have dominated the field of underwater surveying; however, the slow speed of the transporting surface vessel results in a limited area coverage rate. Shallow water surveying remains a challenge because survey ships operate in relatively deep waters. Therefore, the need for faster, more efficient, and more accurate techniques for shallow underwater surveying has led to the development of airborne light detecting and ranging ("LIDAR") systems. The benefits of LIDAR over SONAR include an increase in coverage rate and area, and an improved spatial distribution of soundings. G. C. Guenther, "Airborne Laser Hydrography—System Design and Performance Factors," NOAA Professional Paper Series, LCN 85-600602, March 1985.

LIDAR systems have been developed for a variety of detection purposes, e.g., detection of underwater targets from an airborne platform. The typical LIDAR system is much like the early RADAR systems. A short pulse of optical radiation is transmitted, and a receiver measures the reflected return optical power as a function of time. In principle, the high optical frequency of LIDAR systems should result in improved target resolution over microwave RADAR, but high attenuation and dispersion of the optical signal and lack of coherent signal processing techniques inhibits the exploitation of these benefits in practice. Therefore, there is a need to develop a method to improve the detection sensitivity of existing LIDAR systems.

In contrast, the use of RADAR on the ground, in the air, and on the sea to locate remote objects has been extensive. This technology has experienced many advances in its history, including sophisticated coherent detection schemes. However, the benefits of microwave RADAR cannot be used directly for underwater detection because microwaves do not penetrate water. LIDAR, on the other hand, uses blue-green optical radiation, which can penetrate the water. However, techniques based on coherent detection cannot be applied to LIDAR because light rapidly loses coherency as it travels through water. This disadvantage results in a loss of system sensitivity and underwater target contrast.

SUMMARY OF THE INVENTION

The current invention provides a system in which both LIDAR and RADAR technologies are combined to improve the resolution and sensitivity of conventional LIDAR in the detection and ranging of targets.

Figure 3:
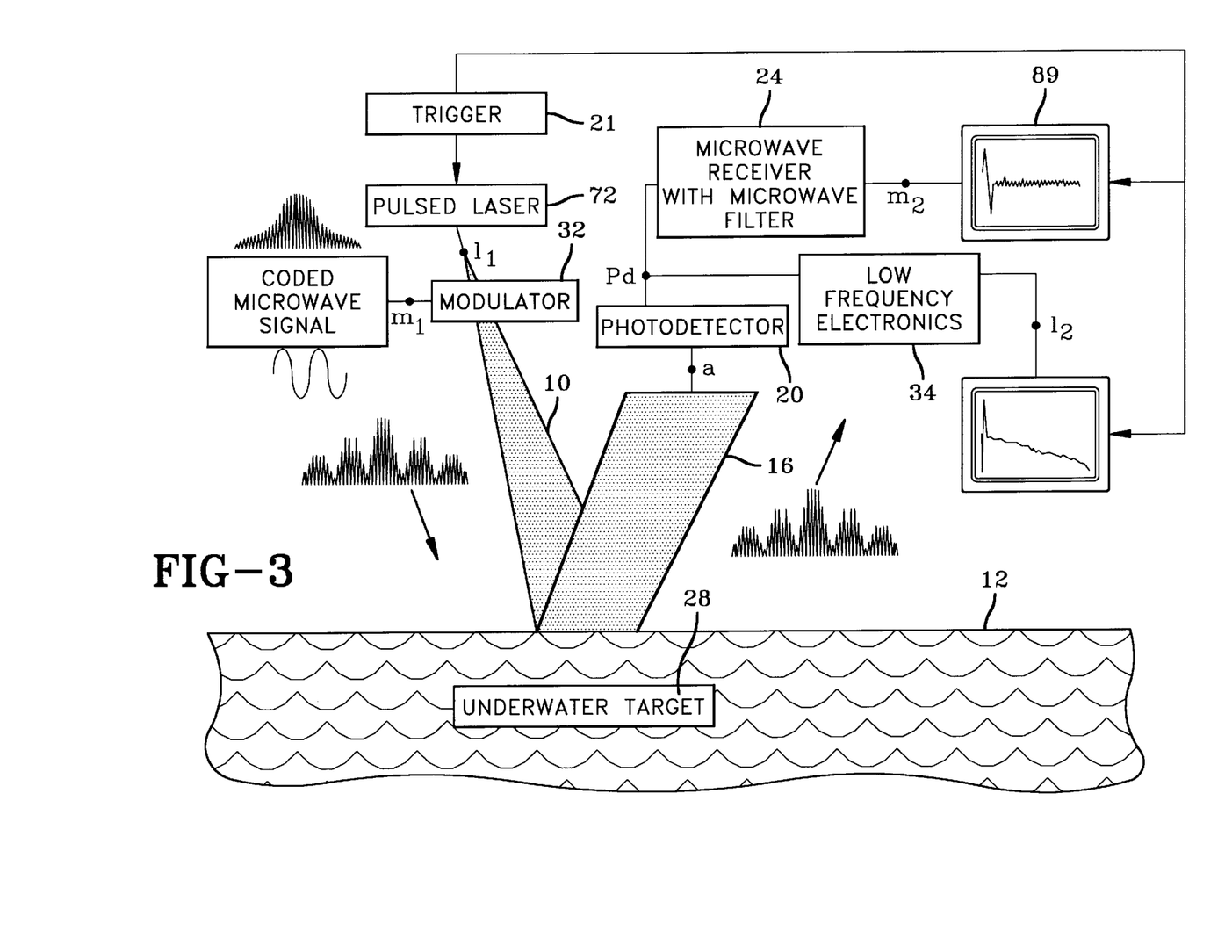
FIG. 3 is a block diagram of hybrid LIDAR-RADAR system implementation of the present invention.

The current invention combines the desirable attributes of RADAR and LIDAR to provide a novel hybrid LIDAR-RADAR system, as shown in FIG. 3. The hybrid LIDAR-RADAR system achieves superior detection by combining the sophisticated signal processing techniques for microwave RADAR with the underwater transmission capacity of LIDAR. Referring to FIG. 3, a conventional LIDAR system between points $1_1$ and $1_2$ is provided. The laser generates pulsed blue-green optical radiation that penetrates deep into the water, and the return signal is captured by an optical detector and investigated for underwater target information.

The application of RADAR to the LIDAR systems is also depicted in FIG. 3. At point $m_1$, a microwave envelope is superimposed on the optical carrier by a high-speed modulator. The blue-green optical carrier then transports the microwave signal through the water. The reflected optical signal, with the microwave envelope, is detected by an aerial optical receiver. At point $m_2$, the microwave signal is recovered by a high-speed photodetector. Therefore, between points $m_1$ and $m_2$, a RADAR system that can be subjected to well-established coherent signal processing is provided. This approach enables one to transmit a RADAR signal underwater as a subcarrier to render target detection and ranging. At the receiver, both the optical carrier (LIDAR signal) and the microwave envelope (hybrid LIDAR-RADAR signal) can be examined simultaneously from a single measurement.

Other objects, advantages and novel features of the invention will become apparent from the following detailed description of the invention when considered in conjunction with the accompanying drawings wherein:

DESCRIPTION OF THE PREFERRED EMBODIMENT

A conventional aerial LIDAR system consists of an optical transmitter and receiver mounted in an aircraft that flies over the ocean. The optical transmitter is preferably a pulsed frequency-doubled Nd:YAG laser with an output at a wavelength of 532 nm. The blue-green wavelength minimizes absorption in water, while the Nd:YAG laser is favored because it can provide short pulses with high peak power, simplicity, ruggedness, and reliability. M. F. Penny, et al., "Airborne Laser Hydrography in Australia," Applied Optics, vol. 25, no. 13, July, 1986. The optical receiver is preferably a collinear optical receiver that includes light collecting optics, a spatial filter to limit the receiver acceptance angle (or receiver field of view), an optical filter to suppress background radiation such as stray sunlight, an optical detector, and signal processing apparatus.

Figure 1:
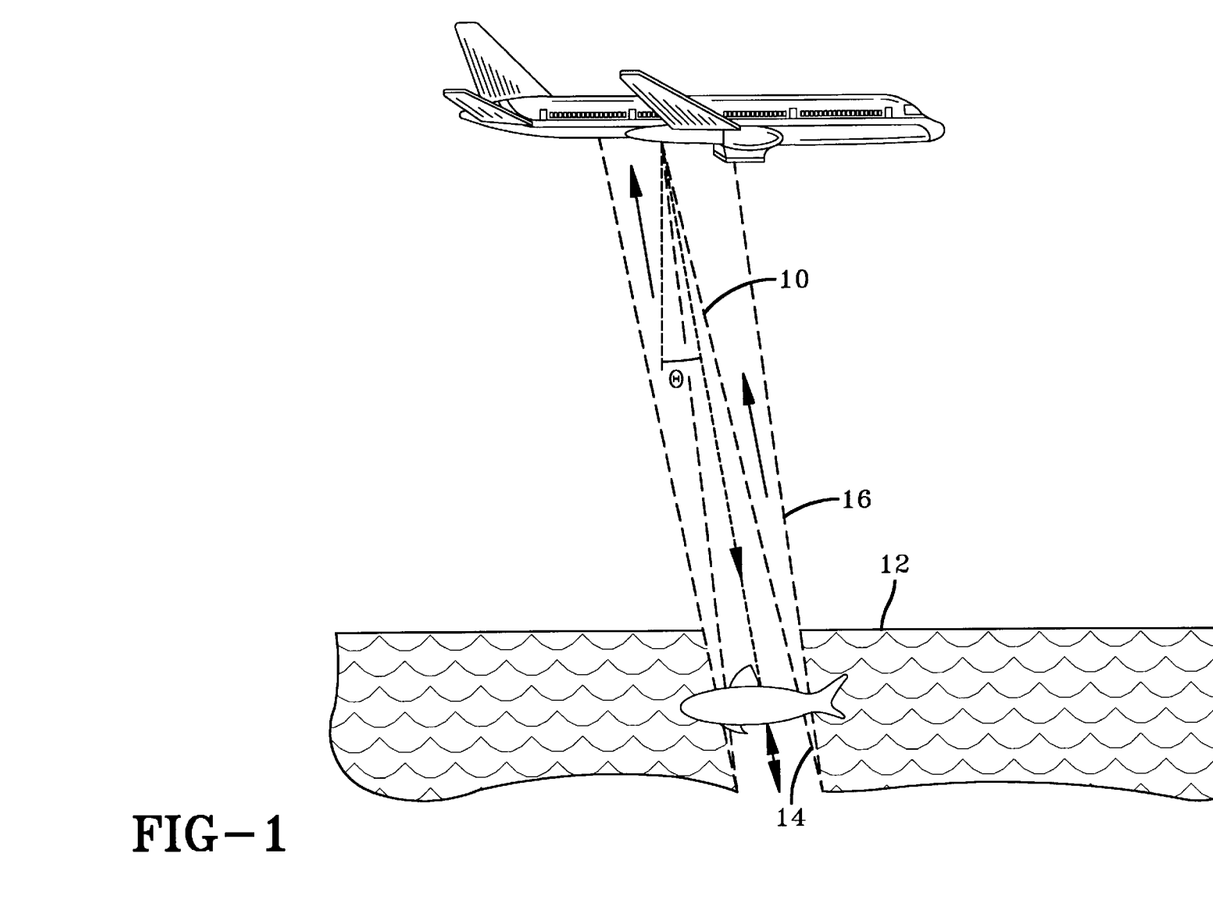
FIG. 1 is a pictorial representation of an aerial LIDAR system.

The transmitted beam 10 sweeps along the water surface 12 with scanning mirrors at an angle, θ, to the vertical, as shown in FIG. 1. At the air/water interface, the light is both reflected and refracted into the water medium, where it is attenuated due to absorption and scattering as it propagates to the ocean bottom. The refracted light 14 is also reflected from underwater objects, reflected from the ocean bottom, and randomly backscattered from the ocean mass. The return signal 16 or echo signal 16 is captured by the optical receiver, and analyzed. Finally, the amplitude of the echo signal 16, which contains the underwater target information, is displayed versus time.

The continuous scattering of the optical beam 10 by entrained particulates in the water introduces dispersion and background clutter, which adversely affect the performance of the conventional LIDAR system. Scattering causes the initially collimated light beam 10 to disperse spatially into a cone of a continuously increasing angle as it propagates to the ocean bottom and back. The spatial dispersion of the optical beam translates into temporal dispersion of the return signal from an underwater object due to path length differences in the reflected light.

Figure 2:
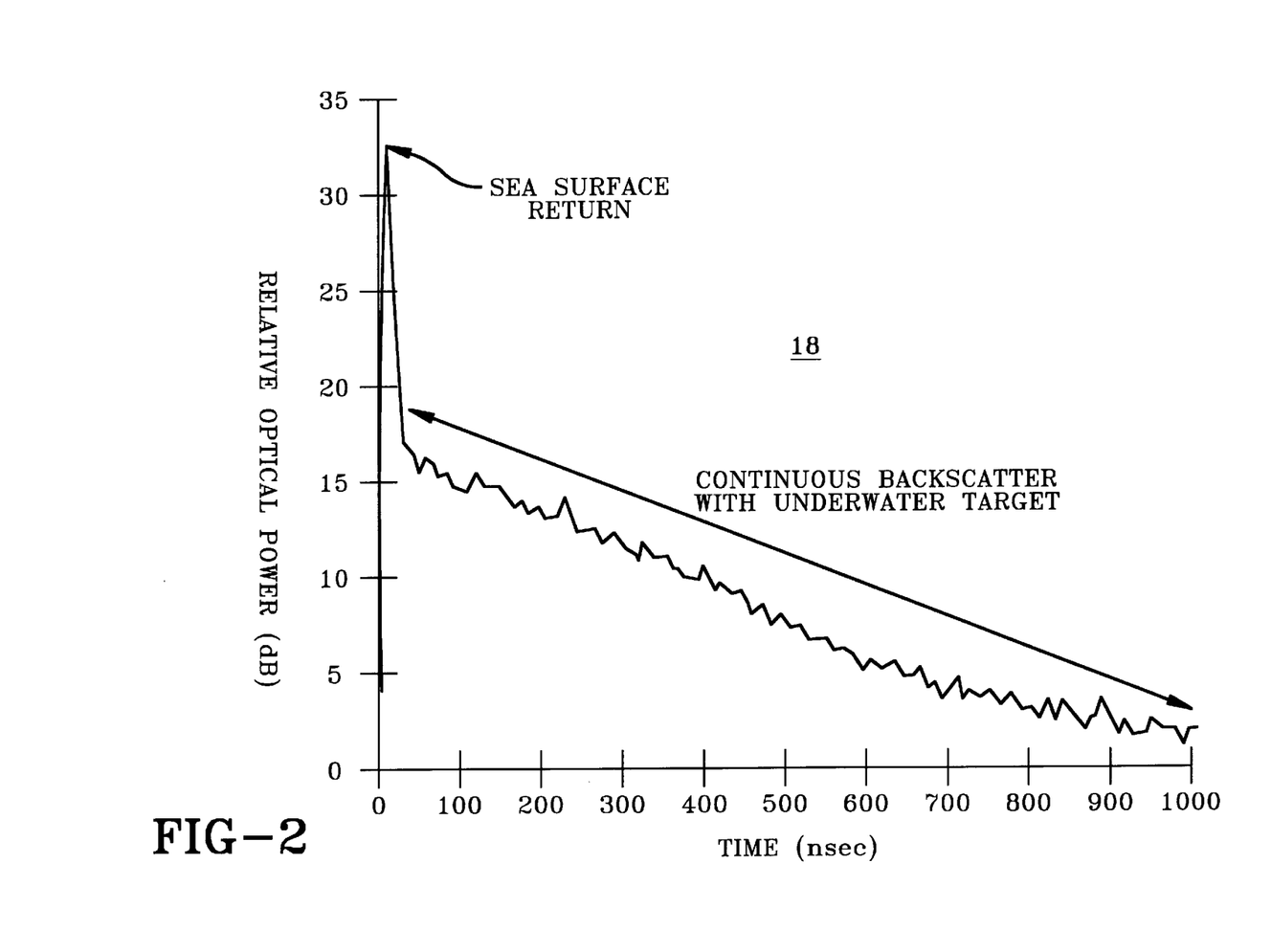
FIG. 2 depicts a recovered LIDAR signal having a sea surface return and a shallow underwater target reflection hidden by continuous water backscatter.

A graphical representation 18 of a typical LIDAR echo signal 16, comprised of the ocean surface reflection, the continuous scattering from the ocean mass, and a reflection from a shallow underwater target, is shown in FIG. 2. This figure also exposes the critical inadequacy of conventional LIDAR. The primary effect of the continuously backscattered light from water is to produce a clutter that limits the contrast of near-surface underwater target reflections, and, therefore, decreases detection sensitivity. Dispersion, while critical in deep water exploration, is of less concern in the case of a shallow water search. The principal challenge, therefore, is to find a method that minimizes backscatter clutter and thereby improves the detection sensitivity of existing LIDAR systems.

To ascertain how the present hybrid LIDAR-RADAR system of the present invention enhances the detection of underwater targets, one must analyze the system depicted in FIG. 3 in greater detail. The unmodulated, conventional LIDAR between points $1_1$ and $1_2$ is considered first. Omitting the effects of dispersion, the amplitude of the optical signal that enters the photodetector 20 at point a is the sum of the return signal from the ocean surface ($A_s$), backscatter from the water ($A_i$), the echo from an underwater target 28 ($A_t$), and the reflection from the ocean bottom ($A_b$):

$$A_T = A_s + \sum_i A_i + A_t + A_b, \quad (1)$$

where $$A_s = A_{so}e^{-2ar}s = a_{so}e^{j2\pi\upsilon}(t-t_s)e^{-2act}s$$

$$A_i = A_{io}e^{-2ar}se^{-2b}(r_i-r_s) = a_{io}e^{-2act}se^{j2\pi\upsilon}(t-t_i)e^{-2bv}(t_i-t_s)$$

$$A_t = A_{to}e^{-2ar}se^{-2b}(r_t-r_s) = a_{to}e^{-2act}se^{j2\pi\upsilon}(t-t_t)e^{-2bv}(t_t-t_s)$$

$$A_b = A_{bo}e^{-2ar}se^{-2b}(r_b-r_s) = a_{bo}e^{-2act}se^{j2\pi\upsilon}(t-t_b)e^{-2bv}(t_b-t_s)$$

In the above expressions, which represent the spatial and temporal response of a conventional LIDAR signal, $r_s$, $r_i$, $r_t$, and $r_b$, are the positions of the ocean surface, distributed scatter, target and ocean bottom. In Eq. 1, the propagation velocities and the attenuation coefficients in the air and water are denoted by the symbols c, v=c/n, a and b, respectively. The frequency of the optical carrier is $\upsilon$ and the coefficients $A_{jo}$ and $a_{jo}$ are constants.

To simplify Eq. 1, several assumptions are made. First, as is customary in the analysis of LIDAR, the time reference at the arrival of the surface return is set to zero by a trigger 21 operatively connected to a pulsed laser 72. Secondly, it is assumed that the underwater object 28 is spatially separated from the ocean surface 12 or ocean bottom by a distance greater than the pulse length, which is in the range of five to ten feet, so that the receiver 24 and low frequency electronics 34 can discriminate between return from the object and return from the ocean surface and bottom. This second assumption permits the neglect, for the present, of $A_s$ and $A_b$ and concentration on the clutter problem.

The output of the optical detector 20 is proportional to the absolute magnitude of the incident optical signal, $|A_T|^2$. Because the coherence length of the laser in the water is very short, the cross terms vanish:

$$|A_T|^2 = \sum_i |A_i|^2 + |A_t|^2$$

where the first term represents the clutter and the second term corresponds to the signal from the target 28. The contrast problem in LIDAR is related to the fact that the first term dominates the return. The detected LIDAR return, $P_{dL}(t)$ at point $P_d$, which is proportional to $|A_T|^2$, can be written as:

$$P_{dL}(t) = P(t) \otimes \left( \frac{\eta F A_r}{R^2} \right) \left\{ \sum_i \rho_i e^{-2\alpha v t_i} \delta(t - t_i) + \rho_t e^{-2\alpha v t_t} \delta(t - t_t) \right\} \quad (3)$$

where $P(t) = P_0 u(t)$ is the transmitted signal with power $P_o$, η is a term that accounts for the efficiency of the transmitting and receiving optics, F defines the finite field of view, $A_r$ is the effective aperture area of the optical receiver, and $\otimes$ denotes the convolution operator. The square law spreading loss, denoted by R, is considered to be a constant because the airplane altitude is much larger than the water depth. The reflectivities of the individual scatterers is $\rho_i$ and the reflectivity of the target is $\rho_t$. The composite power attenuation coefficient in the water due to scattering and absorption is α.

Although the formulation considered here is for continuous wave signals, it can be readily adapted for a pulsed source. In addition, Eq. 3 accounts for an inhomogeneous water column by making the scatterer reflection coefficient dependent on depth. However, this restriction is removed in most LIDAR simulation studies, G. C. Guenther, "Airborne Laser Hydrography —System Design and Performance Factors", NOAA Professional Paper Series, Library of Congress Catalog number 85-600602, March, 1985, and a uniform reflection coefficient, ρ, is introduced. Because the distribution of particulate matter within the water mass is very dense, in LIDAR studies, it is also customary to restate Eq. 3 in a continuous form, B. Billard, R. Abbot, and M. Penny, "Airborne Estimation of Sea Turbidity Parameters From the WRELADS Laser Airborne Depth Sounder," *Applied Optics*, vol. 25, no. 13, July, 1986:

$$P_{DL}(t) = P(t) \otimes \left(\frac{\eta F A_r}{R^2}\right) \{\rho e^{-2\alpha v t}[u(t) - u(t-t_d)] +$$

$$\rho_t e^{-2\alpha v t_t} \delta(t-t_t)\}$$

$$= P(t) \otimes H_{dL}(t) = P(t) \otimes (H_i(t) + H_t(t))$$

where $H_{dL}(t)$ is the impulse response of the water, with components for backscatter, $H_i$, and target, $H_t$. The search time, $t_d = L/v$, relates to the depth of the water column searched, L. The frequency response is obtained by taking the Fourier transform of $H_{dL}(t)$:

$$H_{dL}(f) = H_i(f) + H_t(f) = \qquad (4)$$

$$\left(\frac{\eta F A_r}{R^2}\right) \left\{ \rho \frac{1 - e^{-2\alpha v t_d} e^{j4\pi f t_d}}{\alpha v - j2\pi f} + \rho_t e^{-2\alpha v t_t} e^{j4\pi f t_t} \right\}$$

Figure 4:
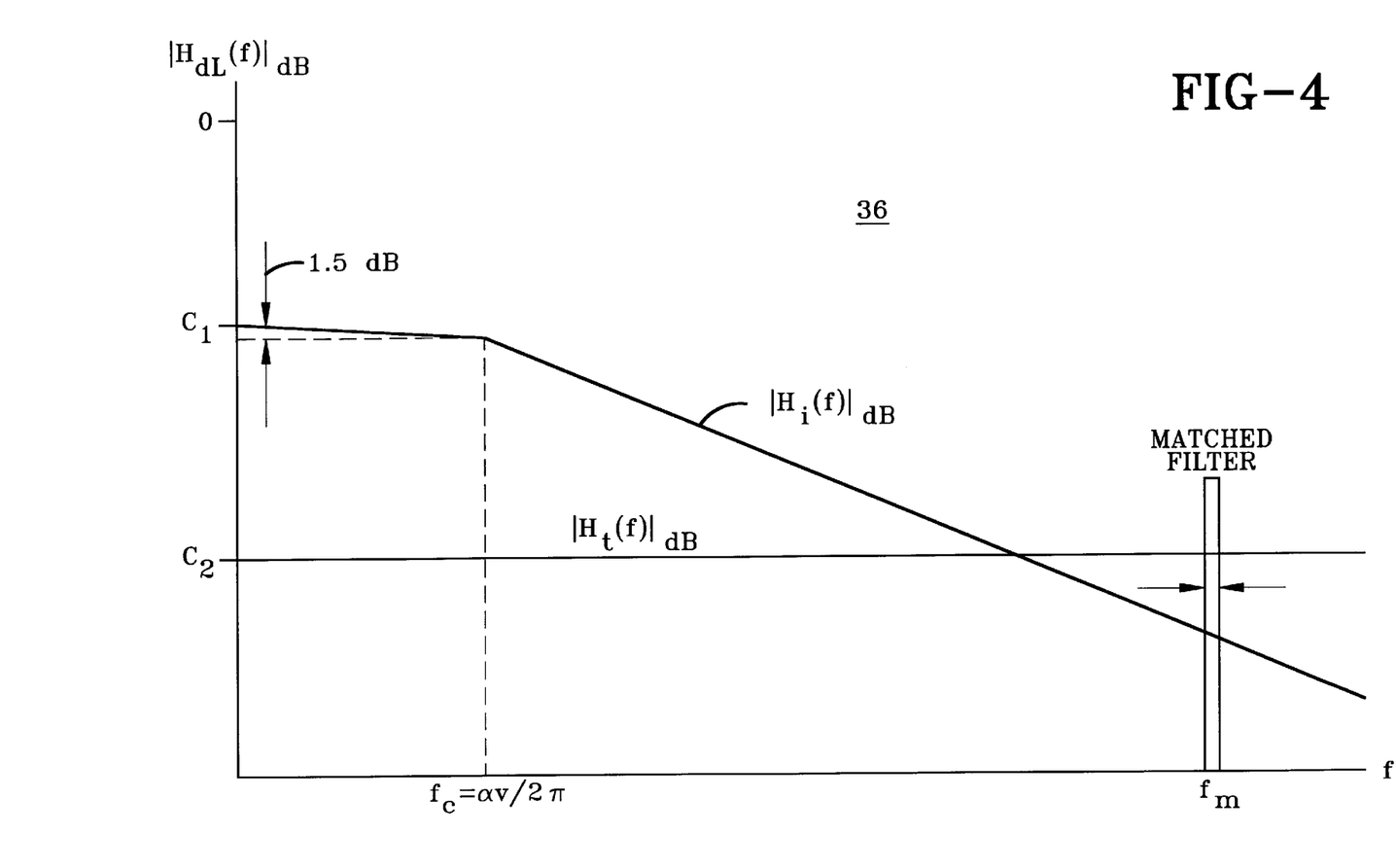
FIG. 4 depicts the amplitude frequency response of a LIDAR return signal having a target component, $|H_t(f)|$, and a backscatter component, $|H_t(f)|$, with $C_1=10\log(\eta FAr\rho/\alpha\upsilon R^2)$ and $C2=10\log(\eta FA_r\rho_r/R^2)-20\alpha\upsilon t_r$.

The term corresponding to continuous backscatter from the water mass has a low-pass filter-like response with a corner frequency of $f_c = \alpha v/2\pi$ when $\alpha v t_b > 1$. The expression representing the reflected signal from an underwater target is a phase term which is directly proportional to the target depth. A graphical representation 36 of the amplitude frequency response, $|H_{dL}(f)|$, of a typical LIDAR return is illustrated in FIG. 4. While the amplitude of the target reflection, $|H_t(f)|$, remains relatively independent of frequency, the backscatter response, $|H_i(f)|$, decays for frequencies above $f_c$. Although no explicit information exists for the corner frequency, one can estimate it from tabulated water attenuation data, N. G. Jerlov, *Optical Oceanography*, vol. 5, Amsterdam: Elsevier Publishing, 1968, to be in the range of 2–10 MHz, with the lower values for clear water. This range suggests a modulating frequency substantially above the corner frequency, $f_c$, where the noise due to backscatter is diminished, but target reflections are unaffected.

In the present hybrid LIDAR-RADAR system, the RADAR signal, with microwave frequency, $f_m$, is applied to the modulator 32 at point $m_1$ in FIG. 3. The transmitted optical power, $P_m(t)$, takes the form, $P_m(t) = P_o[1 + m\cos(2\pi f_m t)] u(t)$, where m is the modulation index. The detected hybrid LIDAR-RADAR return, $P_{dLR}(t)$, at point $p_d$ is:

$$P_{dLR}(t) = P_m(t) \otimes H_{dL}(t) = P_{dL}(t) + P(t) m\cos(2\pi f_m t) \otimes H_{dL}(t) \qquad (5)$$

$$= P_{dL}(t) + P_{dR}(t)$$

Thus, the return signal 16 is comprised of the original unmodulated LIDAR echo, $P_{dL}(t)$, and a term corresponding to the interaction of the microwave envelope with the water medium, $P_{dR}(t)$. The convolution in Eq. (5) yields the expression for the cw microwave modulated return:

$$P_{dR}(t) = P_0 \left(\frac{m\eta F A_r}{R^2}\right) \left[ \frac{\sum_j \rho_j \cos(2\pi f_m t + \phi_j) e^{-2\alpha v t_i}}{\sqrt{1 + \left(\frac{f}{f_c}\right)^2}} + \rho_t \cos(2\pi f_m t + \phi_t) e^{-2\alpha v t_t} \right] \qquad (6)$$

The phase terms, $\phi_j$ and $\phi_t$, account for the delay of the RADAR signal from its interaction with the particulate matter and the target within the water column. The summation represents the accumulation of microwave envelopes, with random phase delays, emanating from the individual, randomly distributed scatterers. This sum, while not negligible, is small due to the random nature of $\phi_j$.

One may compare the signals at points $1_2$ and at $m_2$. The LIDAR signal at $1_2$ is $$S_L(t) = P_{dLR}(t) \otimes H_L(t) = P_{dL}(t) \otimes H_L(t) + P_{dR}(t) \otimes H_L(t) \qquad (7)$$

where $H_L(t)$ is the transfer function of the low frequency electronics 34, which filters out the microwave portion of the signal. Therefore, Eq. 7 becomes $$S_L(t) \cong P_{dL}(t) \otimes H_L(t) = \{P(t) \otimes [H_i(t) + H_t(t)]\} \otimes H_L(t)$$

The signal at $m_2$ is $$S_M(t) = P_{dLR}(t) \otimes H_M(t) = P_{dL}(t) \otimes H_M(t) + P_{dR}(t) \otimes H_m(t) \qquad (8)$$

where $H_M$ is the transfer function of the microwave receiver 24, which includes a narrow bandpass filter with center frequency $f_m >> f_c$, and a microwave detector. The matched filter eliminates the low frequency part of the return yielding $$S_M(t) \cong P_{dR}(t) \otimes H_M(t) = P_o[G_i(t) + G_t(t)] \otimes H_M(t)$$

For the LIDAR signal at $1_2$, Eq. (7), the return is dominated by the low frequency clutter, characterized by $H_i(t)$, which effectively masks the target reflection. For the RADAR signal at $m_2$, the effect of the low frequency clutter is replaced by the composite backscatter of the microwave envelope, $G_i$. Because the phases of these high-frequency returns are randomly distributed, their sum tends to zero. However, the distinct return from the underwater target retains the coherency of the microwave envelope and is unaffected in the return.

To compare the present hybrid system with conventional LIDAR, Eqs. 7 and 8 were evaluated for a representative LIDAR experiment using narrow laser pulses. Pulse widths ranging from 5–20 nsec are common in LIDAR, which implies a modulation frequency in the GHz range if the pulse is to contain several microwave cycles. A 10 nsec pulse modulated at 3 GHz was selected for this computation. The bandwidth of the low-frequency electronics was assigned a typical value of 100 MHz, while the passband of the matched microwave receiver was variable. The results revealed a target contrast increase from 20 dB to 38 dB as the passband of the microwave filter is decreased from 500 MHz to 3 MHz. Clearly, the hybrid detection scheme has the potential to significantly enhance the detection sensitivity of underwater objects by suppressing incoherent backscatter clutter.

A new methodology, a hybrid LIDAR-RADAR detection system that reduces the clutter limiting the performance of LIDAR has been introduced. The following proof-of-concept experimentations verify this assertion. First, an empirical ocean mass simulator (OMS), which realistically and accurately reproduces the optical properties of the ocean, is described. Second, the development of an extensive computer simulation, which permits investigation of alternate modulation formats and receiver configurations, is discussed. The laboratory experiment utilizing the OMS and implementing the hybrid detection scheme is then examined.

The desire to experimentally test the feasibility of the present LIDAR-RADAR detection scheme in a laboratory environment without the cost of actual surveying measurements led to the development of an empirical fiber based ocean mass simulator (OMS). The main requirements for an ocean mass simulator are that it be a simple, inexpensive, laboratory-based instrument with similar attenuation characteristics to water. It is known that plastic optical fiber has low transmission loss, T. Kaino, et al., "Low-Loss Plastic Optical Fibers," *Applied Optics*, vol. 20, no. 17, September, 1981, and high scattering loss, T. Yamashita, et al., "Light Scattering Measurement in PMMA Optical Fibers," *Japanese Journal of Applied Physics*, vol 26, no. 11, pp. L1797–L1799, November, 1987, in the blue-green (532 nm). Optical time domain reflectometry studies have demonstrated that the backscatter process in multimode fibers is comparable to that in water, and is characterized by an exponential decay, M. K. Barnoski and S. M. Jensen, "Fiber Waveguides: A Novel Technique for Investigating Attenuation Characteristics," *Applied Optics*, vol. 15, no. 9, pp. 2112–2115, September, 1976. Modulated optical time domain reflectometry measurements in optical fiber have also shown that the continuous backscatter from optical fiber exhibits a low-pass filter-like frequency response, while Fresnel reflections from fiber breaks and bends are independent of frequency. D. Uttam and B. Culshaw, "Precision Time Domain Reflectometry in Optical Fiber Systems Using a Frequency Modulated Continuous Wave Ranging Technique," *Journal of Lightwave Technology*, vol. LT-3, no. 5, pp. 971–977, October, 1985; R. I. MacDonald, "Frequency Domain Optical Reflectometer," *Applied Optics*, vol. 20, no. 10, pp. 1840–1844, May, 1981; J. Nakayama, et al., "Optical Fiber Fault Locator by the Step Frequency Method," *Applied Optics*, vol. 26, no. 3, pp. 440–443, February, 1987. The comparable attributes pertaining to the propagation and scattering of optical rays in ocean water and large multimode fiber led to the design of the OMS using this fiber.

Figure 5A:
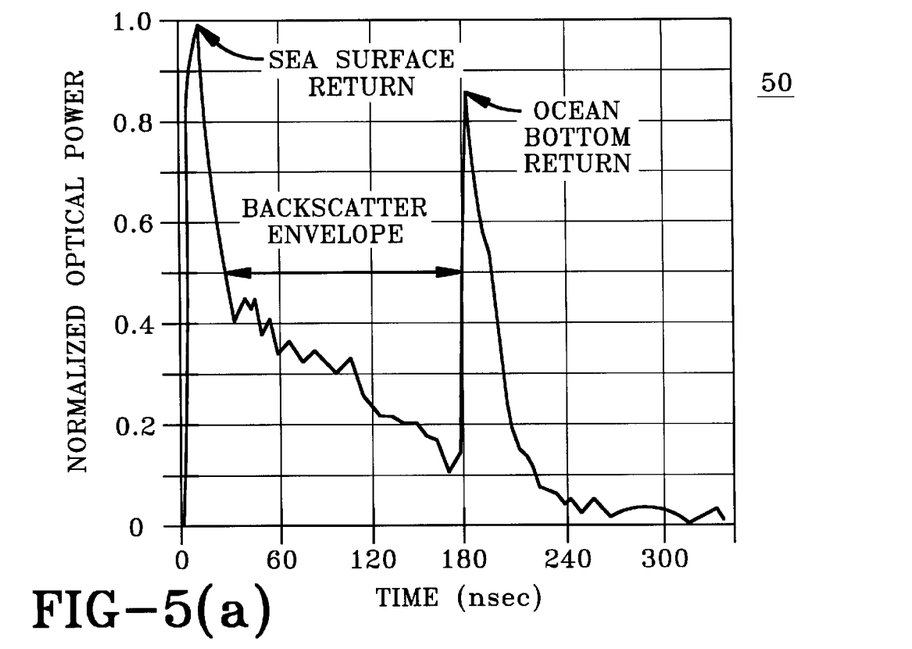
FIGS. 5(a) and 5(b) illustrate the similar features present in a LIDAR signal recovered from an actual target (a) and an Ocean Mass Simulator (OMS) (b): sea surface (or fiber front) return, backscatter from ocean (or fiber) mass, and ocean bottom (or fiber end) reflection.
Figure 5B:
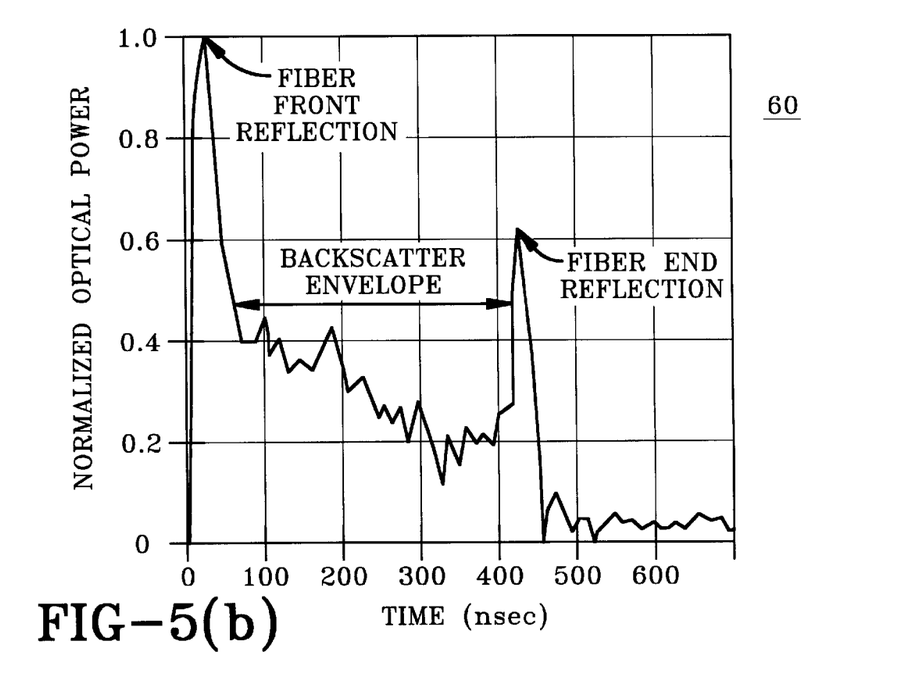

The completed OMS, as reported by Mullen, consists of 100 m of plastic optical fiber wrapped uniformly around a rod. L. Mullen, et al., "Analytical and Experimental Evaluation of an Optical Fiber Ocean Mass Simulator," *IEEE Microwave and Guided Wave Letters*, vol. 4, no. 1, pp. 17–19, January, 1994. Different water types are simulated by changing the rod diameter, while a reflection, corresponding to that from an underwater object, is produced by bending the fiber sharply at a specific point. Similarities between the backscatter signatures corresponding to an actual target and OMS are illustrated in the graphical representations 50, 60 of FIGS. 5(*a*) and 5(*b*), respectively. These results warrant confidence in the ability of the OMS to validate experimentally the projected clutter suppression of the hybrid detection scheme.

Figure 6:
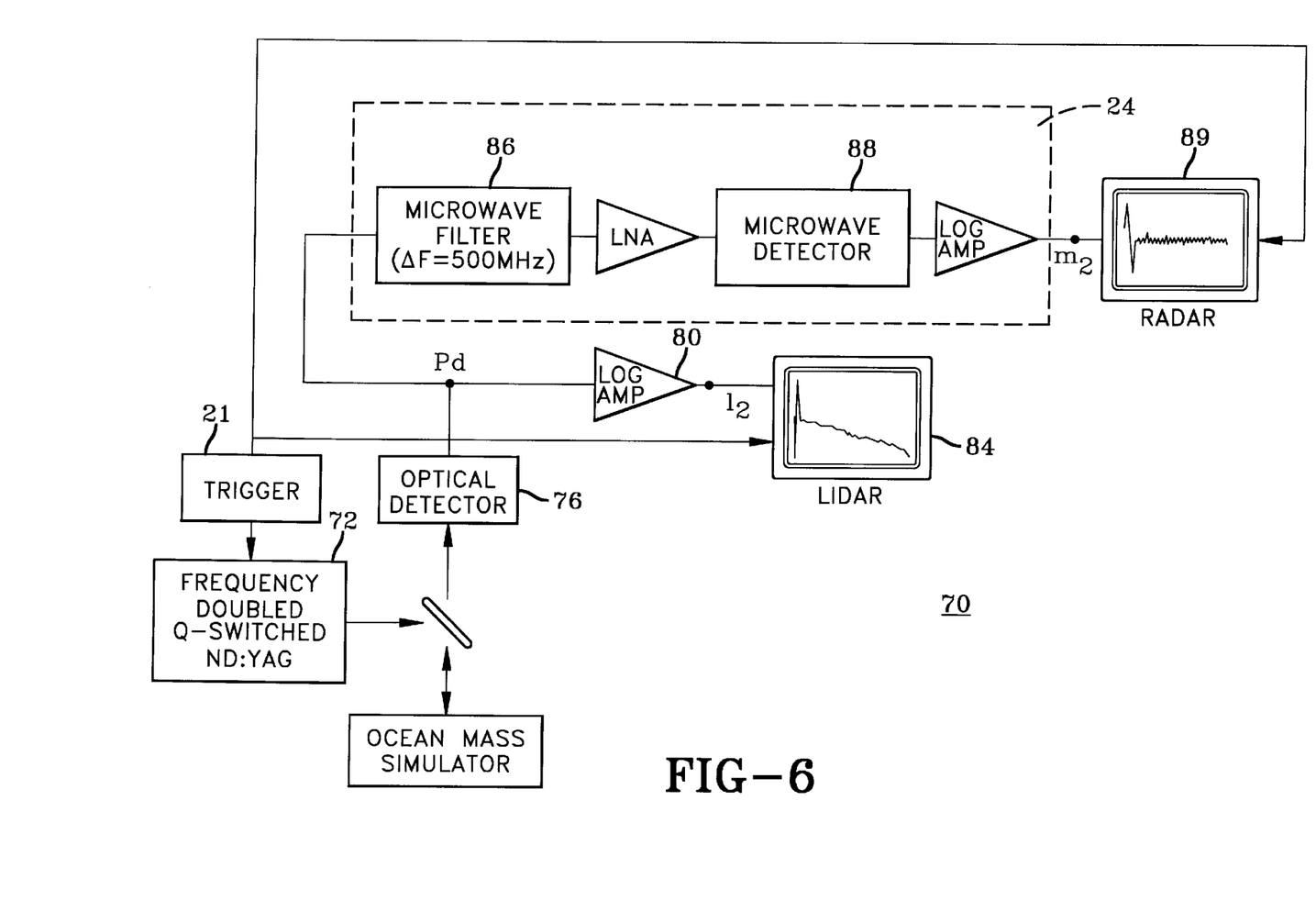
FIG. 6 is a block diagram of an experimental laboratory implementation of a hybrid LIDAR-RADAR detection scheme.

The experimental setup 70 implementing the LIDAR-RADAR sensor configuration and utilizing the OMS is shown in FIG. 6. The optical source 72 is a Q-switched, frequency-doubled Nd:YAG laser. The modulation frequency is 3 GHz, which is substantially above the backscatter noise cutoff frequency, $f_c$, and provides 30 cycles of the microwave signal within the laser pulse time. The main challenge in this experimentation is the generation of high-power, microwave-modulated blue-green pulses capable of overcoming the large backscatter dynamic range, approximately 60 dB. The best results were obtained by using the 3 GHz beat frequency produced by the multi-longitudinal mode laser that produced microwave-modulated, blue-green pulses having adequate optical power. The main problem with this modulation source is the lack of pulse-to-pulse repeatability.

At the output of optical detector 76 at point $p_d$ in FIG. 6, the detected hybrid LIDAR-RADAR signal from the OMS, $P_{dLR(t)}$, is split equally into two signal paths and processed independently. In the LIDAR detection mode, a 100 MHz bandwidth logarithmic amplifier 80 effectively filters the microwave component of the signal, $P_{dR(t)}$, while the LIDAR signal component, $P_{dL(t)}$, is recovered, digitized and displayed on display 84. At the microwave receiver, the low frequency part of the signal, $P_{dL(t)}$, is filtered out by a 500 MHz bandpass filter 86 centered at fm=3 GHz. Although earlier calculations have shown that implementing a narrower filter is more desirable, the use of a broad bandwidth matched receiver is presently required because of the drift of the modulation source. After passing through the filter 86, the microwave envelope is amplified, detected at a microwave detector 88 and analyzed and displayed on a microwave display 89. Trigger 21, which triggers pulsed laser 72, also triggers displays 89 and 84, to time the delay between optical transmission and detection. This experimental procedure provides for simultaneous measurement and evaluation of the LIDAR and microwave signal returns.

In parallel with the development of the OMS, a computer simulation was implemented to reproduce the characteristic signature obtained in a LIDAR system and in an OMS setup. The simulation, with built in signal processing procedures, predicts laboratory results and aids in the design of more advanced transmitter and receiver configurations.

The simulation is based on Eq. 5 (or Eqs. 7 and 8). The pertinent parameters employed in the runs are summarized in Table 1. The length of the water column searched, L, was partitioned into compartments of length $\Delta l$, each compartment containing a scattering center. Alternatively, in the time domain, the scattering centers are separated by a time interval, $\Delta T_s$. To accurately model the water medium, it is imperative to assume that the density of scatterers is large, which imposes the condition that $\Delta l \ll L$ (or equivalently $\Delta T_s \ll t_d = L/v$=search time). The sampling time or resolution of the signal is defined by the time increment, $\delta t$, used to divide the pulse into segments. This value is chosen to satisfy the Nyquist criterion, A. Oppenheim and A. S. Willsky, *Signals and Systems*, New Jersey: Prentice-Hall, 1983, and therefore makes the simulation fully compatible with various signal processing routines. To produce a realistic simulation, Eqs. 7 and 8 were augmented to include the relative intensity noise (RIN) of the laser and the noise equivalent power (NEP) of the optical detector.

TABLE 1

| SIMULATION PARAMETER | RANGE | TYPICAL VALUES |
|---|---|---|
| search length (L) | 20–200 m | 100 m |
| search time ($t_d$) | 100–2000 ns | 500 ns |
| search resolution ($\Delta l$) | 0.002–0.2 ns | 0.02 m |
| time increment ($\zeta t$) | 0.01–1 ns | 0.1 ns |
| backscrattering time interval ($\Delta T_s$) | 0.01–10 ns | 0.1 ns |
| pulsewidth ($T_p$) | 5–100 ns | 10 ns |
| modulation frequency ($f_m$) | 1–10 GhZ | 3 Ghz |
| modulation index (m) | 20–100% | 100% |
| relative intensity noise (RIN) | 1–5% | 2% |
| noise equivalent power (NEP) | <50 pW/Hz$^{1/2}$ | <50 pW/Hz$^{1/2}$ |

The simulation tracks the evolution of the pulse as it propagates from the ocean surface toward the ocean bottom, including the backscatter and target reflection. By updating this information and displaying it on the screen at regular time intervals, the simulator creates an animation that facilitates physical insight. The simulation also emulates the receiver with advanced signal processing tools like Fourier transform, averaging, filtering and heterodyning to facilitate optimal receiver design. For direct comparison of simulation and laboratory experimental results, the typical values listed in Table 1 were chosen to represent those used in the laboratory experiment.

The laboratory experimental results obtained with the OMS setup in FIG. 6 are compared directly with those obtained with the computer simulation and set forth herein below. The comparison of simulation and experimental results verifies theoretical predictions and validates the computer model for predicting future improvements to be achieved with more sophisticated modulation and detection schemes.

Figure 7A:
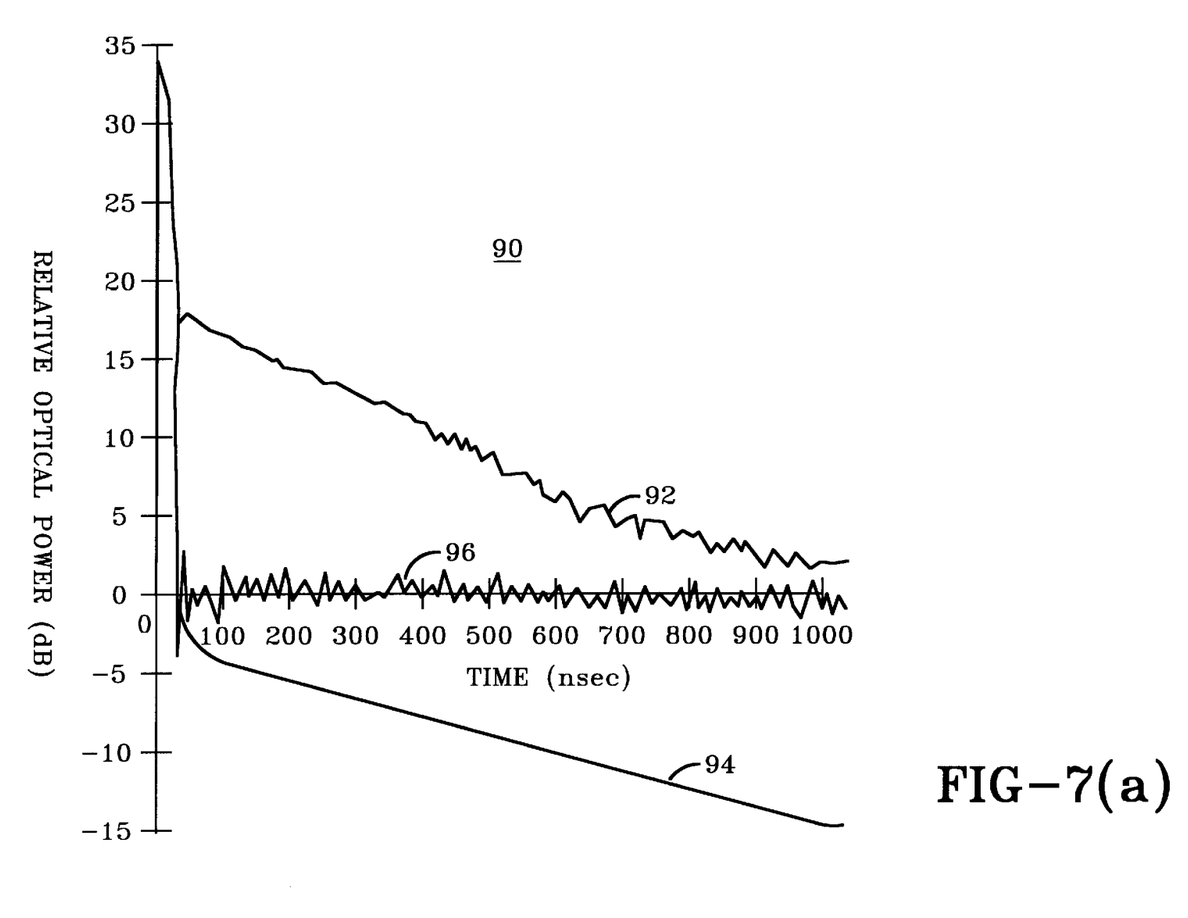
FIGS. 7(a) and 7(b) depicts computer-simulated (a) and experimental (b) LIDAR and RADAR return signals where no underwater target echo is present.
Figure 7B:
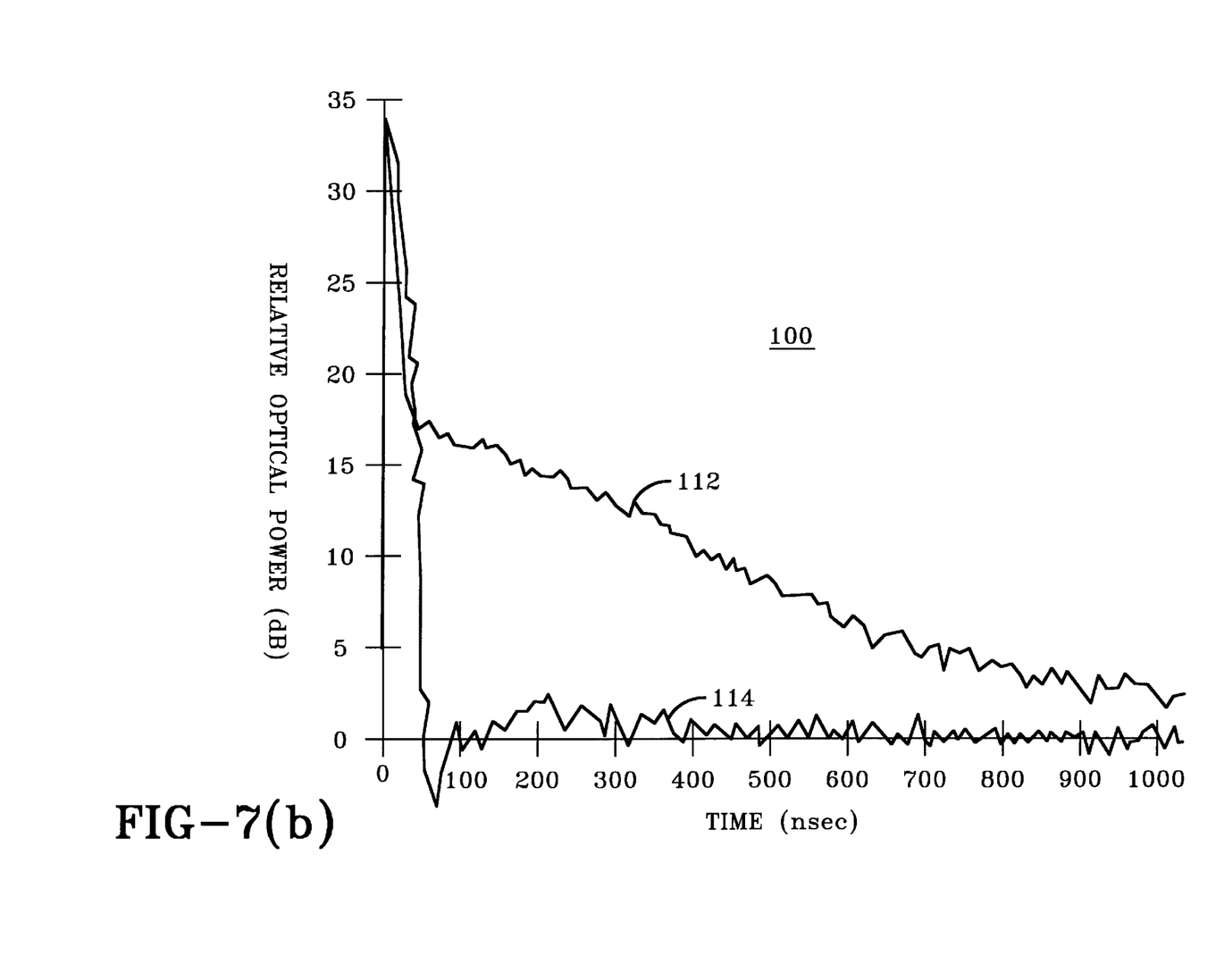
Figure 8A:
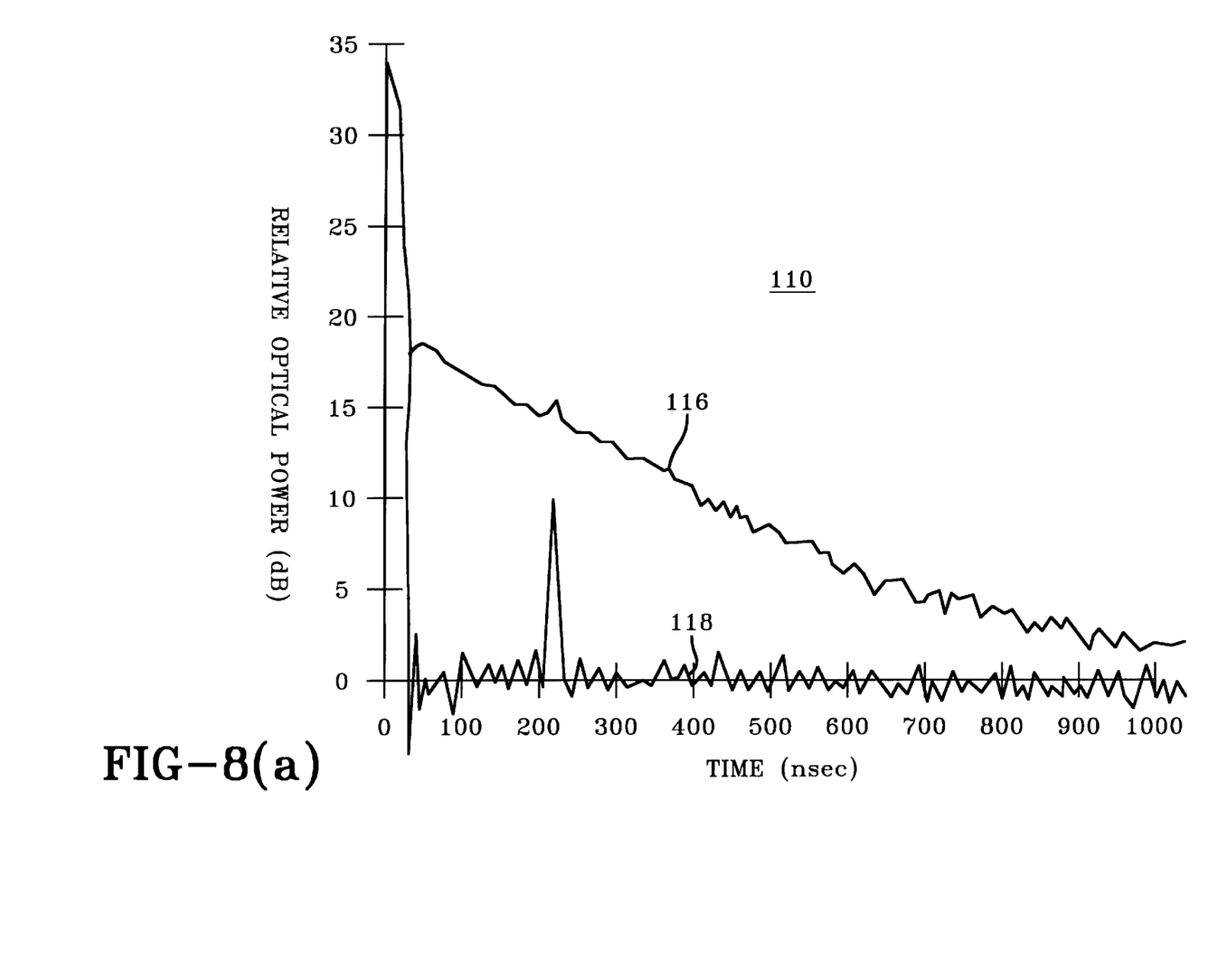
FIGS. 8(a) and 8(b) depicts computer-simulated (a) and experimental (b) LIDAR and RADAR return signals where an underwater target echo is present.
Figure 8B:
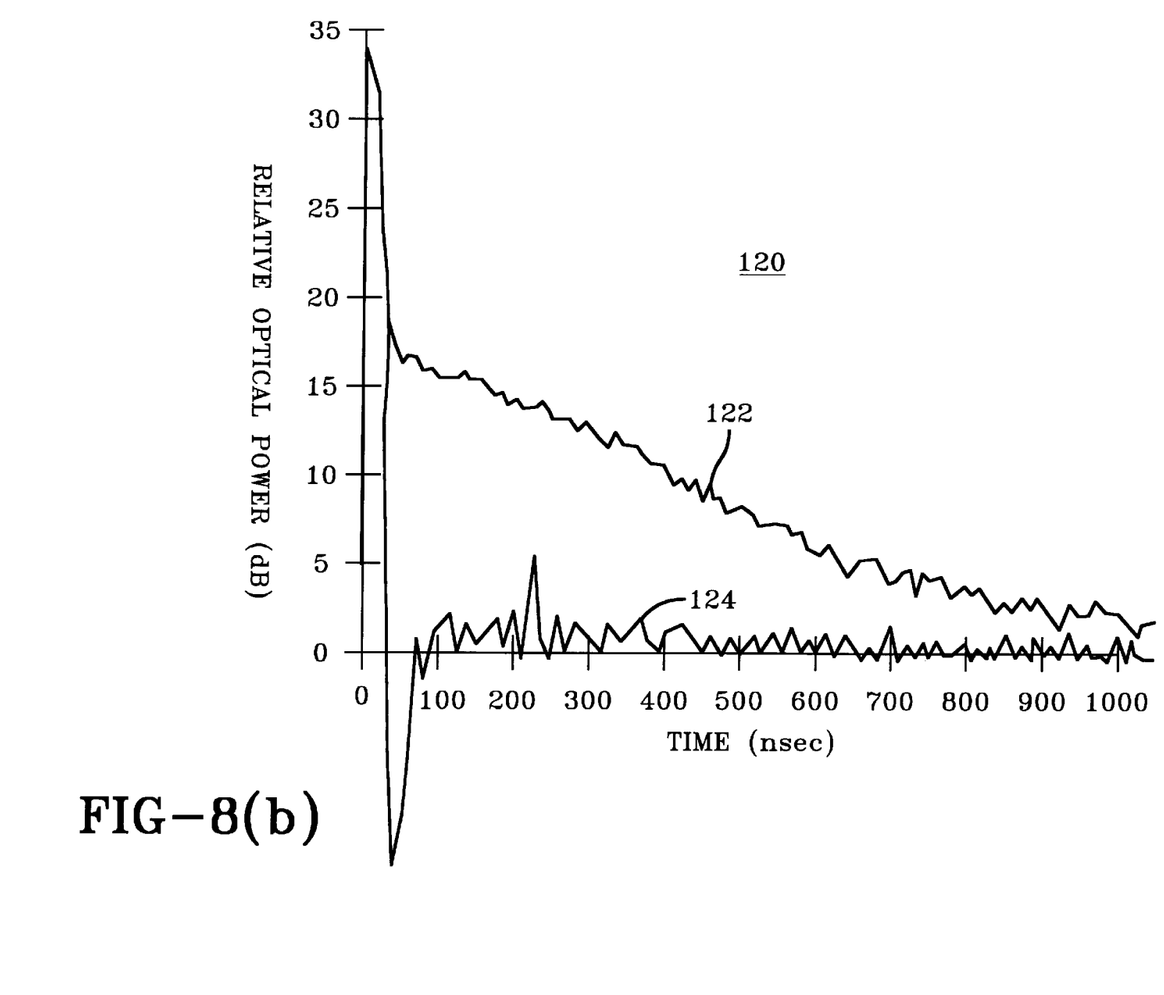

The computer simulation and laboratory experimental results of LIDAR and microwave RADAR signal returns of a 10 nsec modulated pulse are summarized in FIGS. 7(a), 7(b) and 8. In particular, the graphical representations 90, 100 of FIGS. 7(a) and 7(b) depict returns with no target and accent the clutter reduction capacity of the hybrid approach. The target contrast enhancement achieved with the hybrid detection scheme is shown in the graphical representations 110, 120 of FIGS. 8(a) and 8(b). Waveform 92 of FIG. 7(a) demonstrates the computer simulated clutter in a LIDAR return, $S_{L(t)}$. It is proportional to the received photon intensity, which decreases with return time (or depth of reflection) and, therefore, exhibits a characteristic exponential decay. Waveform 94 represents the microwave return signal, $S_{M(t)}$, as recorded by a noise-free ideal receiver. The effect of the 500 MHz filter at 3 GHz is to reduce the photon-dependent clutter level by 20 dB, as predicted. Upon the addition of realistic receiver characteristics to the simulation, the system noise, which is independent of the return signal, exceeds the reduced clutter level, as shown in waveform 96. The corresponding experimental results are set forth in FIG. 7(b), wherein waveform 112 substantially corresponds to waveform 92 and waveform 114 substantially corresponds to waveform 96. Thus the experimental results are in substantial agreement with the computer simulations and, therefore, validate the analytic considerations. It must be emphasized that the implementation of a narrower matched filter of 3 MHz, for example, would attenuate the clutter level by an additional 20 dB and decrease the microwave receiver noise significantly. This improvement is however contingent on the development of a better modulated transmitter.

The clutter reduction leads directly to enhanced detection sensitivity, as shown in FIGS. 8(a) and 8(b). The graphical representation 110 in FIG. 8(a) depicts the LIDAR computer simulated return signal 116 and the microwave RADAR computer simulated return signal 118 that include a shallow underwater target. The target contrast enhancement is evident by comparing the two returns, which are also in good conformity with the experimental results in FIG. 8(b). FIG. 8(b) shows experimental LIDAR return signal 122 and experimental microwave RADAR return signal 124. By using the hybrid LIDAR-RADAR system, the target detection sensitivity is limited by system noise, which can be reduced by transmitter and receiver optimization.

The main difference between the LIDAR and microwave RADAR returns is the backscatter clutter level. Because the clutter is proportional to the number of photons in LIDAR measurements, there is no incentive to increase the transmitted laser power. However, in the hybrid detection scheme, the noise is independent of the photon intensity and, therefore, one can use shorter pulses with high peak power to improve the signal to noise and spatial resolution of underwater targets.

Thus, use of the present hybrid detection scheme results in a suppression of backscatter clutter. While the backscatter clutter has a low-pass filter-like frequency response, the target reflection has a relatively flat frequency response. Accordingly, the noise due to the clutter can be diminished without significantly altering the target reflections by modulating the laser at a frequency well above the corner frequency of the backscatter low-pass filter response and using sophisticated matched filter detection schemes. Experimental results demonstrate that reductions of approximately 20 dB in initial backscatter clutter can be achieved. This number is expected to increase as the modulated transmitter and microwave receiver configurations are improved to decrease the system noise level.

Although much of the above discussion has occurred in the context of aerial detection of shallow underwater targets, the described LIDAR system has the capability to be used in a multitude of other applications. For example, the system could be used to locate and identify sea life. The system also could be used for underwater-to-underwater applications, including mine detection and identification, obstacle detection, bottom mapping and environmental measurements. Further, the technique could be used for atmospheric remote sensing at any wavelength that has high transmission in the atmosphere, including infrared, visible and ultraviolet. It should be further emphasized that each of these applications, and others, can incorporate the various modulation techniques used in microwave radar systems, such as short pulse, doppler, chirp and pseudo-random.

Each technical article cited herein is hereby incorporated by reference thereto as if set forth in its entirety. Although a present preferred embodiment of the invention and variations thereon have been illustrated and described, the invention is not limited thereto but may be embodied otherwise within the scope of the following claims.

We claim:

1. A LIDAR system for detecting the presence of and determining the range of an object within a water mass by detecting a reflected signal from the water mass and discriminating the object from continuous backscatter from the water mass, comprising:

a pulsed blue-green laser for providing and transmitting towards the water mass an optical carrier signal which is reflected from the water mass thereby producing the reflected signal;

a source of microwave energy for providing a microwave subcarrier signal;

a modulator for modulating the optical carrier signal with the microwave subcarrier signal;

a photodetector for detecting the reflected signal and producing an electrical signal indicative thereof;

a microwave receiver for passively filtering the electrical signal at the modulation frequency of the microwave subcarrier signal and producing a signal indicative of the presence of the object; and means for measuring the time delay between when the optical carrier signal is transmitted and when the reflected signal is detected.

2. The system of claim 1, wherein the microwave receiver comprises:

a bandpass filter for substantially removing the low frequency part of the electrical signal to provide a filtered microwave signal;

an amplifier for amplifying the filtered microwave signal to provide an amplified microwave signal;

a microwave detector for detecting the amplified microwave signal to provide the signal indicative of the presence of the object.

3. The system of claim 1, further comprising a means for analyzing the signal indicative of the presence of the object.

4. A method of detecting the presence of and determining the range of an object within a water mass comprising the following steps:

generating and transmitting towards the water mass a pulsed optical carrier signal having a blue-green wavelength, which optical carrier signal is reflected from the water mass thereby producing a reflected signal;

modulating the pulsed optical carrier signal with a coded microwave subcarrier signal;

detecting the reflected signal and producing an electrical signal indicative thereof;

passively filtering the electrical signal at the modulation frequency of the microwave subcarrier signal thereby removing continuous backscatter from the water mass and producing a signal indicative of the presence of the object; and measuring the time delay between when the optical carrier signal is transmitted and when the reflected signal is detected.

5. The method of claim 4, further comprising the step of analyzing the signal indicative of the presence of the object.

* * * * *